United States Patent
Dutta

(10) Patent No.: US 6,983,424 B1
(45) Date of Patent: Jan. 3, 2006

(54) AUTOMATICALLY SCALING ICONS TO FIT A DISPLAY AREA WITHIN A DATA PROCESSING SYSTEM

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 09/599,893

(22) Filed: Jun. 23, 2000

(51) Int. Cl.
*G06K 15/00* (2006.01)

(52) U.S. Cl. ...................... 715/800; 715/790

(58) Field of Classification Search ........... 345/798, 345/799–800, 838, 837, 845, 846, 847, 784, 345/779, 744–747, 600, 661, 662–671, 801, 345/790, 792, 794–796, 802, 804, 853–854, 345/806–807; 707/523; 715/800
See application file for complete search history.

(56) References Cited

U.S. PATENT DOCUMENTS

| | | | | |
|---|---|---|---|---|
| 5,227,771 A | | 7/1993 | Kerr et al. ................. 340/731 |
| 5,293,455 A | * | 3/1994 | Castelaz ..................... 706/25 |
| 5,404,316 A | * | 4/1995 | Klingler et al. ............ 345/723 |
| 5,428,736 A | | 6/1995 | Kahl et al. .................. 395/159 |
| 5,721,848 A | * | 2/1998 | Joseph ........................ 345/798 |
| 5,757,468 A | | 5/1998 | Patton et al. ................ 355/40 |
| 5,771,042 A | * | 6/1998 | Santos-Gomez ........... 345/800 |
| 5,771,380 A | | 6/1998 | Tanaka et al. ........... 707/104.1 |
| 5,774,121 A | * | 6/1998 | Stiegler ...................... 715/769 |
| 5,841,438 A | | 11/1998 | Cave .......................... 345/348 |
| 5,852,440 A | | 12/1998 | Grossman et al. ......... 345/348 |
| 5,903,265 A | * | 5/1999 | Bogdan ...................... 715/800 |
| 5,933,830 A | | 8/1999 | Williams ................... 707/100 |
| 6,057,842 A | * | 5/2000 | Knowlton et al. ......... 345/846 |
| 6,072,486 A | * | 6/2000 | Sheldon et al. ............ 345/779 |
| 6,112,184 A | * | 8/2000 | O'Brien, Jr. ................. 705/5 |
| 6,138,130 A | * | 10/2000 | Adler et al. ................ 715/503 |
| 6,181,838 B1 | * | 1/2001 | Knowlton ................... 382/305 |
| 6,225,998 B1 | * | 5/2001 | Okita et al. ................. 345/798 |
| 6,285,842 B1 | * | 9/2001 | Katamoto et al. ............ 399/81 |
| 6,310,634 B1 | * | 10/2001 | Bodnar et al. .............. 345/854 |
| 6,389,437 B2 | * | 5/2002 | Stoub ......................... 707/523 |

(Continued)

FOREIGN PATENT DOCUMENTS

JP    62-266671    11/1987

(Continued)

OTHER PUBLICATIONS

Livingston et al., Microsoft Windows Me Secrets Millenium Edition, pp. 37-65, 70-80, 117-160, 165-178, 238-243, IDG Books, Foster City, Ca. Mar. 2000.*

(Continued)

*Primary Examiner*—Steven Sax
(74) *Attorney, Agent, or Firm*—Marilyn S. Dawkins; Dillon & Yudell LLP

(57) ABSTRACT

A method, system, and program is provided for displaying icons on a data processing system. The number of icons to be displayed on the computer screen is determined. The boundary area for displaying the icons on the computer screen is calculated. The sizes of the icons are then scaled to a size that allows all icons to be displayed in the boundary area while utilizing all available display space. The minimum and maximum sizes of the icons can be limited based on user preferences. If the icons cannot be scaled to fit within the boundary area using the user selected minimum size, then only a portion of the icon is displayed. In this manner, all icons are scaled and displayed at a size that utilizes the full boundary area of the display screen.

31 Claims, 11 Drawing Sheets

U.S. PATENT DOCUMENTS

| | | | |
|---|---|---|---|
| 6,424,354 B1 * | 7/2002 | Matheny et al. | 345/619 |
| 6,456,305 B1 * | 9/2002 | Qureshi et al. | 715/800 |
| 6,473,102 B1 * | 10/2002 | Rodden et al. | 715/788 |
| 6,501,487 B1 * | 12/2002 | Taguchi | 345/788 |
| 2002/0000998 A1 * | 1/2002 | Scott et al. | 345/667 |

FOREIGN PATENT DOCUMENTS

| | | |
|---|---|---|
| JP | 05-282372 | 10/1993 |
| JP | 07-244568 | 5/1995 |
| JP | 07-146765 | 6/1995 |
| JP | 07-281863 | 10/1995 |
| JP | 07-334338 | 12/1995 |
| JP | 08-263255 | 10/1996 |
| JP | 09-128192 | 5/1997 |
| JP | 10-293759 | 11/1998 |
| JP | 11-045169 | 2/1999 |
| JP | 11-110182 | 4/1999 |
| JP | 2000-200213 | 7/2000 |

OTHER PUBLICATIONS

Microsoft Press, Windows NT Resource Kit, Ch. 10, Microsoft Corporation, 1995.*

Report on Introduction of SQL Server, Magazine, Nov. 1, 1997, pp. 202-203, vol. 2, No. 11, IDG Communications Corp., Chiyodaku, Japan.

* cited by examiner

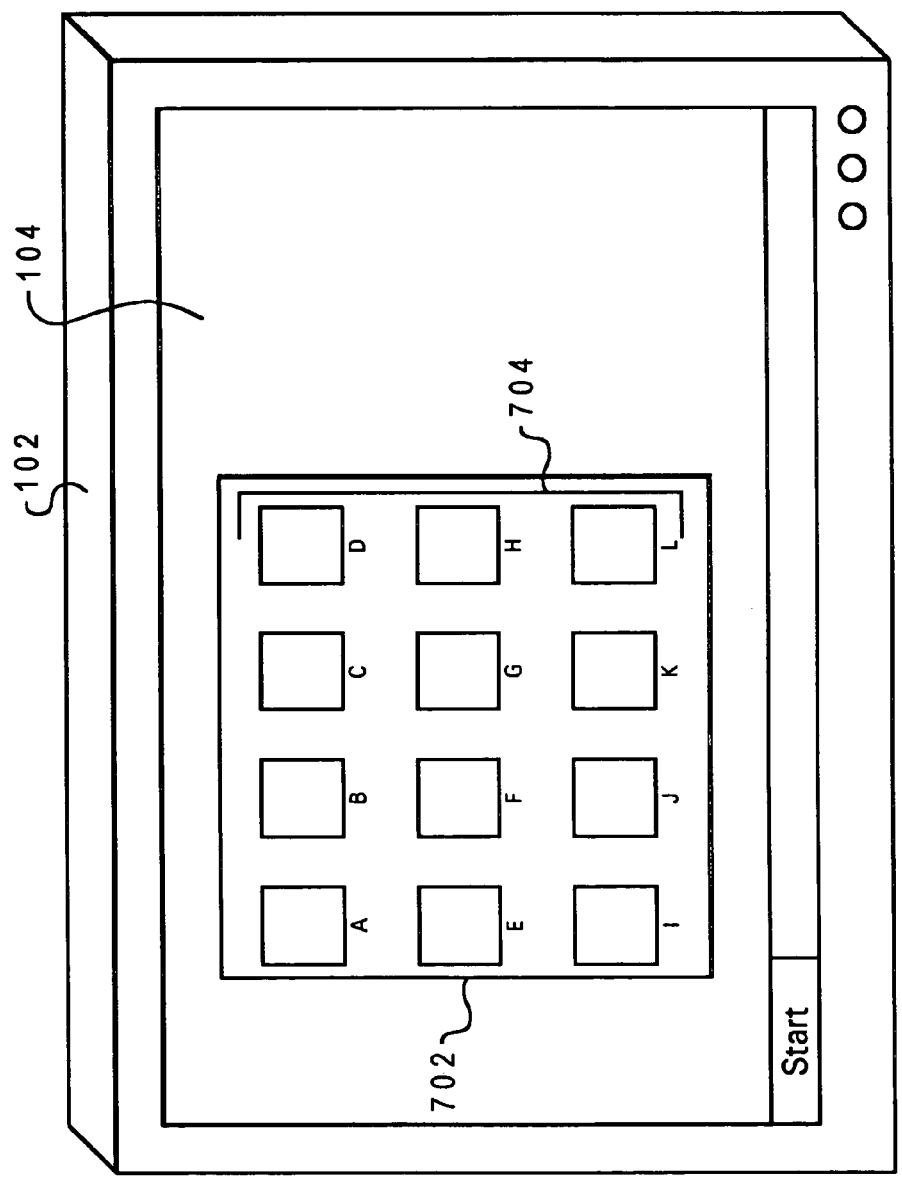

AUTOMATICALLY SCALING ICONS TO FIT A DISPLAY AREA WITHIN A DATA PROCESSING SYSTEM

BACKGROUND OF THE INVENTION

1. Technical Field

The present invention relates in general to data processing systems and in particular, the present invention relates to data processing systems for displaying icons. Still more particularly, the present invention relates to data processing systems for scaling icons to fit a display area.

2. Description of the Related Art

Data processing systems commonly use icons to represent an object that can be manipulated by a user of the data processing system. Typical objects include programs, documents, images, sound files, video files, and macro instructions. The advantage of icons are that they serve as visual mnemonics and allow users to control certain computer actions without having to remember commands or type them in at the keyboard. Icons are a significant factor in the user-friendliness of graphical user-interfaces.

Data processing systems utilizing icons have display screens with wide-ranging capabilities. Some data processing systems, such as small handheld devices, have screen sizes as small as three inches by three inches. The small physical size of the screen in such a system limits the amount of information that can be displayed on the screen and still be large enough to be read by a user of the data processing system. In other data processing systems, the physical size of the screen is very large and the screen can display information at a very high resolution. When viewing information designed for a standard screen on such a high resolution system, information appears to be physically compressed. Due to this compression, the displayed information can appear so small that the user is unable to read or recognize the information.

With reference to FIG. 1, there is illustrated a graphical representation of a typical video display 102 with a display screen 104 displaying window 106. This figure depicts a system that may have a small physical size, such as a handheld computer. Within window 106 are displayed icons 108. Due to the small screen size, icons 108 appear very large and they do not all fit within the dimensions of window 106. As a result, several icons are hidden from view and are not readily accessible by the user. In order for a user to gain access to these icons, the user must scroll window 106 down so that the hidden icons can be displayed within window 106. A consequence of scrolling window 106 is that some of the icons located at the top of window 106 will be scrolled beyond the upper dimension of window 106 and become inaccessible. Scrolling the window to gain access to hidden icons diminishes some of the efficiency of an icon.

With reference to FIG. 2, there is depicted a graphical representation of a typical video display 102 with a display screen 104 displaying window 202. This figure illustrates a system that may have a large screen size with the display set at a high resolution mode. Within window 202 are displayed icons 204. Due to the large physical size of the screen and the high resolution display mode, icons 204 appear very small. Due to their small size, icons 204 are difficult to see and read thereby making it difficult to locate and utilize a particular icon. If a desired icon cannot be easily located and utilized, its usefulness is diminished.

Manually scrolling the screen to reveal hidden icons or hunting to find a difficult to identify icon is undesirable and inconvenient. Accordingly, as is apparent from the foregoing description, it would be desirable to provide an improved method of displaying icons on a video screen by scaling the icons within a minimum and maximum size to fit the available area of the video screen.

The present invention relates in general to data processing systems and in particular, the present invention relates to data processing systems for displaying icons. Still more particularly, the present invention relates to data processing systems for scaling icons to fit a display area of a video screen.

SUMMARY OF THE PRESENT INVENTION

It is therefore one object of the present invention to provide an improved data processing system for displaying icons.

It is another object of the present invention to provide an improved data processing system for scaling icons.

It is yet another object of the present invention to provide an improved data processing system for displaying icons by automatically scaling the size of icons.

The foregoing objects are achieved as is now described. A method, system, and program is provided for displaying icons on a data processing system. The number of icons to be displayed on the computer screen is determined. The boundary area for displaying the icons on the computer screen is calculated. The sizes of the icons are then scaled to a size that allows all icons to be displayed in the boundary area while utilizing all available display space. The minimum and maximum sizes of the icons can be limited based on user preferences. If the icons cannot be scaled to fit within the boundary area using the user selected minimum size, then only a portion of the icon is displayed. In this manner, all icons are scaled and displayed at a size that utilizes the full boundary area of the display screen.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 7a depicts a graphical representation of a video display screen displaying scaled icons that may be utilized to implement a preferred embodiment of the present invention;

DETAILED DESCRIPTION OF THE PREFERRED EMBODIMENT

This invention is described in a preferred embodiment in the following description with reference to the figures, in which like numbers represent the same or similar elements.

Figure 1:
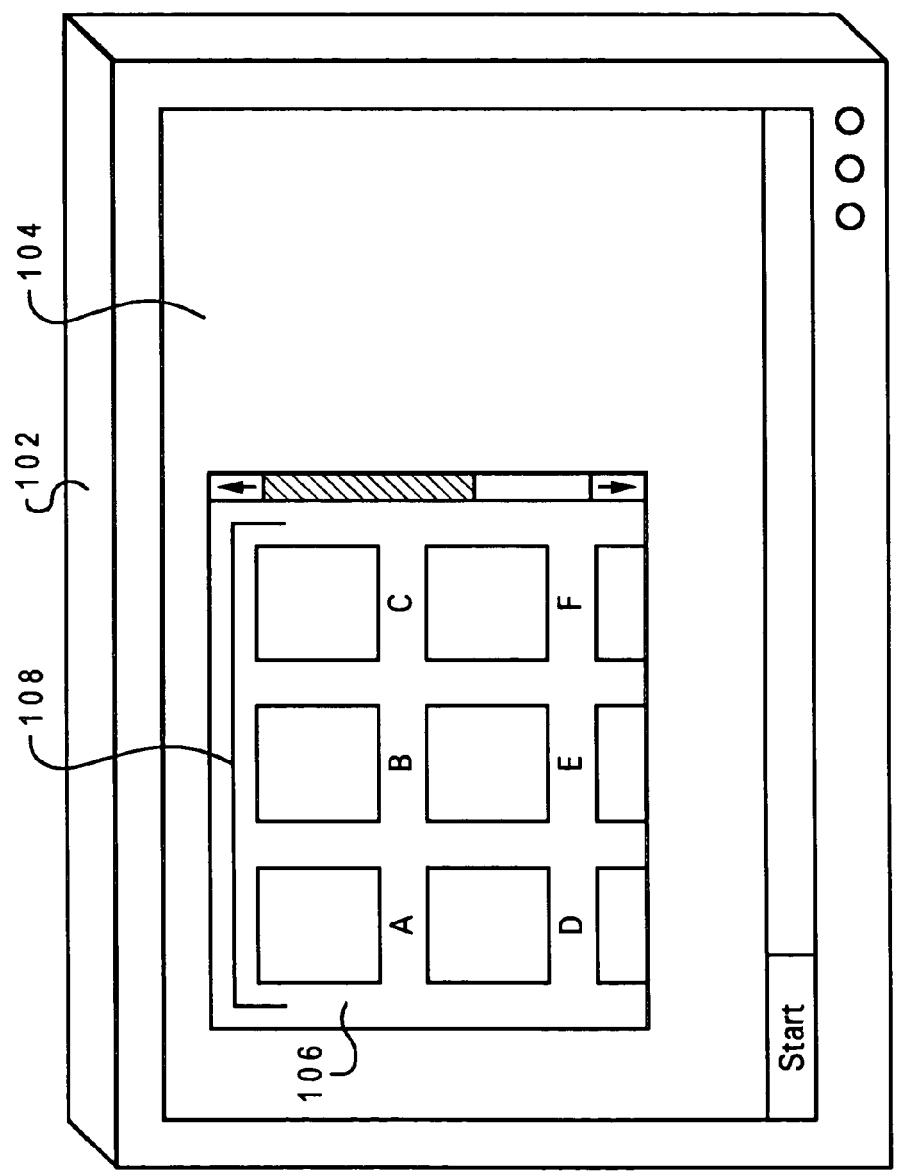
FIG. 1 illustrates a graphical representation of a conventional video display screen displaying icons.
Figure 2:
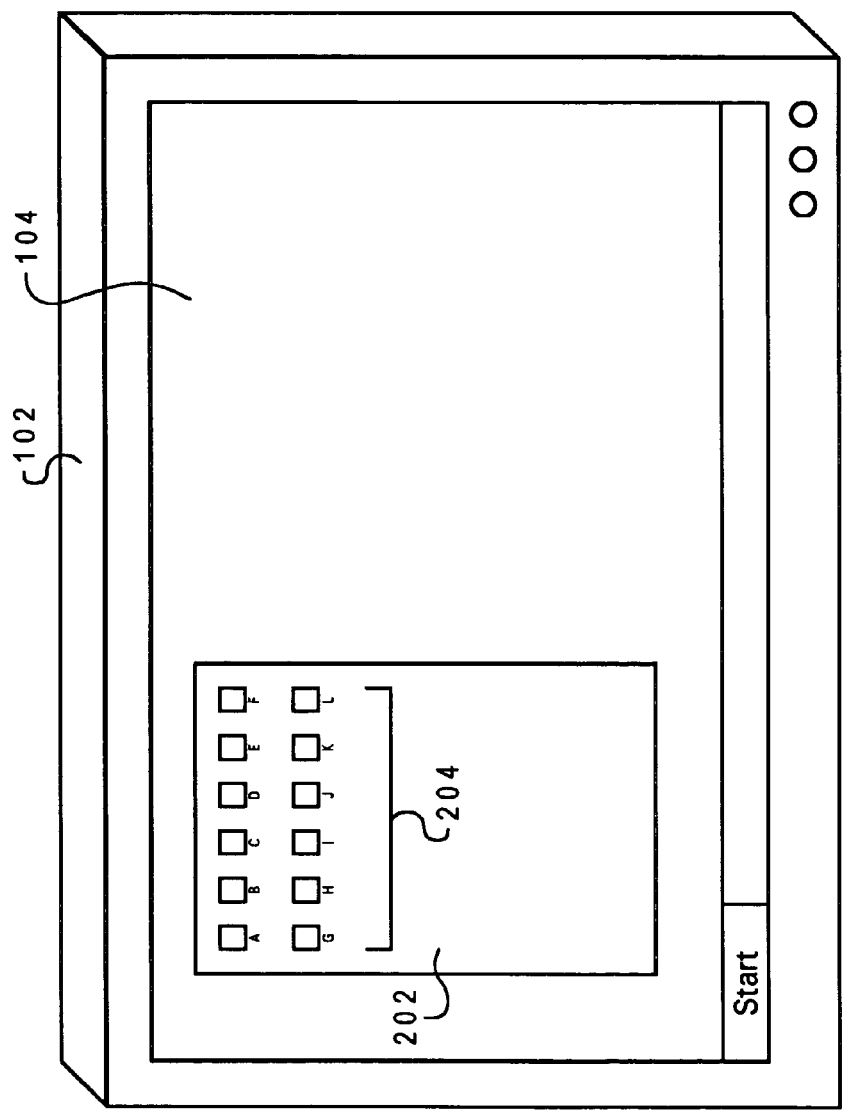
FIG. 2 depicts a graphical representation of a conventional video display screen displaying icons.
Figure 3:
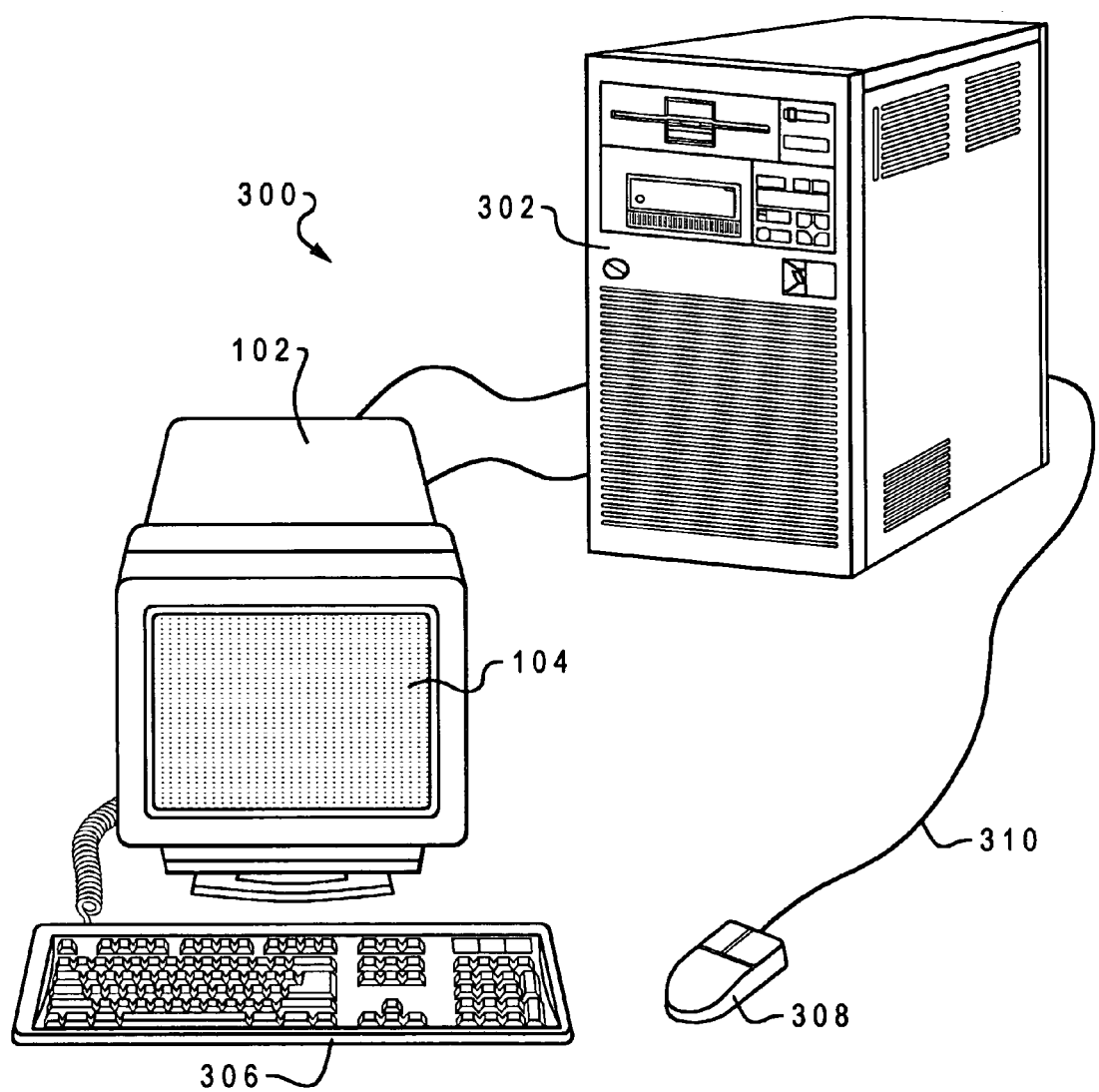
FIG. 3 illustrates a pictorial representation of a data processing system, which may be utilized to implement a preferred embodiment of the present invention.

With reference now to the figures and in particular with reference to FIG. 3, there is illustrated a pictorial representation of a data processing system 300 which may be utilized to implement a preferred embodiment of the present invention. A data processing system 300 is depicted that includes a system unit 302, a video display 102, a keyboard 306, and a mouse 308. Keyboard 306 is that part of data processing system 300 that resembles a typewriter keyboard and which enables a user to control particular aspects of the computer. Because information flows in one direction, from keyboard 306 to system unit 302, keyboard 306 functions as an input-only device. Functionally, keyboard 306 represents half of a complete input/output device, the output half being video display 102. Keyboard 306 includes a standard set of printable characters presented in a QWERTY pattern typical of most typewriters. In addition, keyboard 306 often includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display 102.

Mouse 308 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 310 connects mouse 308 to a computer such as data processing system 300. By moving mouse 308 on a surface (e.g., a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse functions, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons.

Data processing system 300 can be implemented utilizing any suitable computer such as the IBM ThinkpadÔ data processing system, a product of International Business Machines Corporation, located in Armonk, N.Y. However, those skilled in the art will appreciate that a preferred embodiment of the present invention can apply to any data processing system, regardless of whether the computer is a complicated multi-user computing apparatus, a single user workstation, a laptop, a personal digital assistant, a palmtop, a hand held data processing device, or another portable computer.

Figure 4:
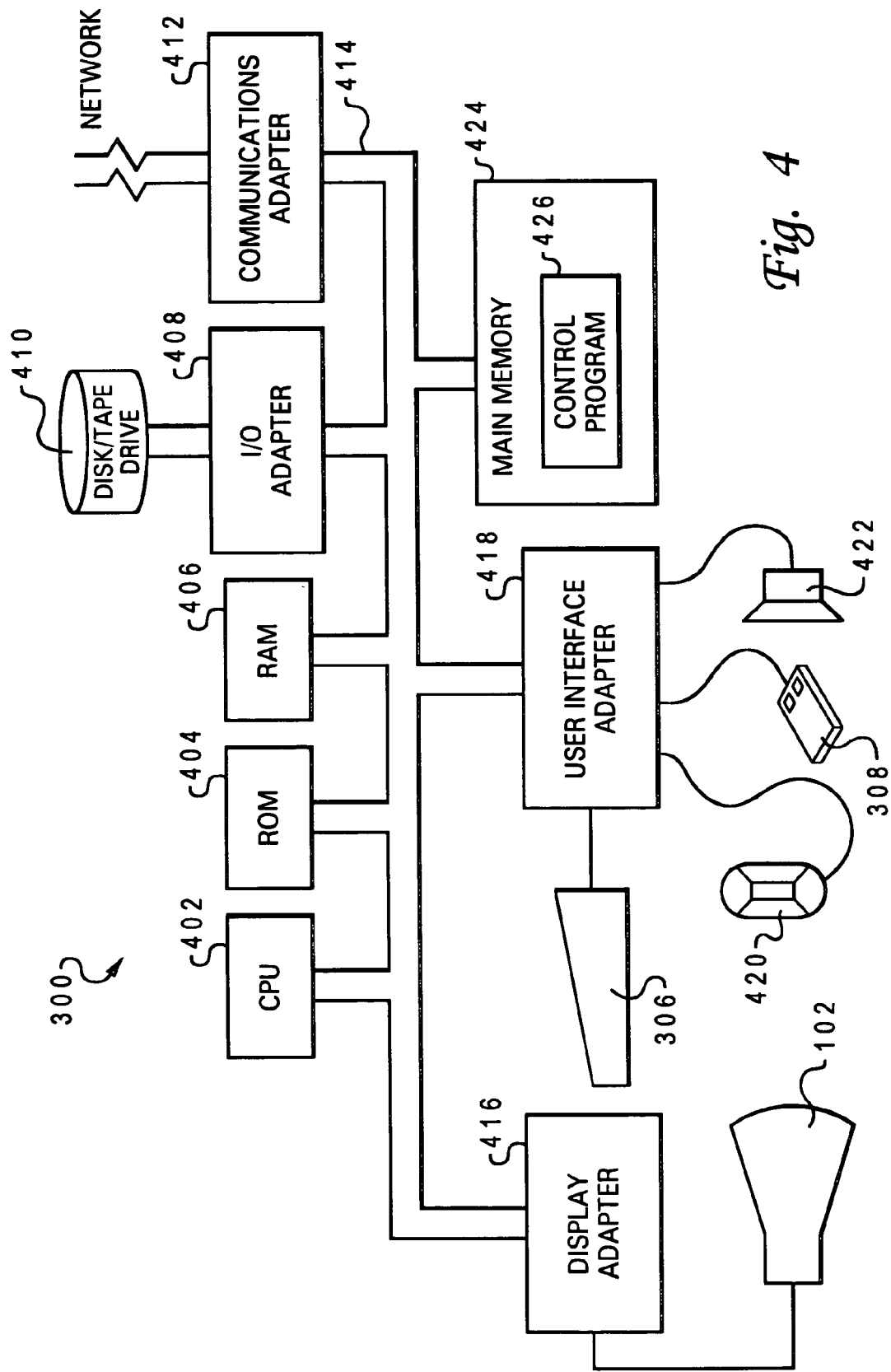
FIG. 4 depicts a representative hardware environment of the data processing system illustrated in FIG. 3.

With reference now to FIG. 4, there is illustrated a representative hardware environment of the data processing system illustrated in FIG. 3. Data processing system 300 includes a Central Processing Unit (CPU) 402, such as a conventional microprocessor, and a number of other units interconnected via a system bus 414. CPU 402 includes a portion of data processing system 300 that controls the operation of the entire data processing system, including the arithmetical and logical functions contain in a particular computer program. Although not depicted in FIG. 4, CPU's such as CPU 402 typically include a control unit that organizes data and program storage in a computer memory and transfers the data and other information between the various parts of the data processing system. Such CPUs also generally include an arithmetic unit that executes arithmetical and logical operations, such as addition, comparison, multiplications and so forth. Such components and units of data processing system 300 can be implemented in a system unit such as system unit 302 of FIG. 3.

Data processing system 300 further includes read-only memory (ROM) 404, random-access memory (RAM) 406, display adapter 416, and Input-Output (I/O) adapter 408 for connecting peripheral devices (e.g., disk and tape drives 410) to system bus 414. ROM 404 is a type of memory that retains information permanently and in which the stored information cannot be altered by a program or normal operation of a computer. RAM 406 is a type of memory designed such that the location of data stored in it is independent of the content. Also, any location in RAM 406 can be accessed directly without having to work through from the beginning.

Video display 102 is the visual output of data processing system 300. Video display 102 can be a cathode-ray tube (CRT) based video display well known in the art of computer hardware. However, with a portable or notebook-based computer, video display 102 can be replaced with a liquid crystal display (LCD) based or gas plasma-based flat-panel display. Data processing system 300 further includes user interface adapter 418 for connecting keyboard 306, mouse 308, speaker 422, microphone 420, and/or other user interface devices, such as a touchscreen device (not shown), to system bus 414. Communications adapter 412 connects data processing system 300 to a computer network. Although data processing system 300 is shown to contain only a single CPU and a single system bus, it should be understood that the present invention applies equally to data processing systems that have multiple CPUs and to data processing systems that have multiple buses that each perform different functions in different ways.

Data processing system 300 also includes an interface that resides within a machine-readable media to direct the operation of data processing system 300. Any suitable machine-readable media may retain the interface, such as, ROM 404 RAM 406, a magnetic diskette, magnetic tape, or optical disk (the last three being located in disk and tape drives 410). Any suitable operating system and associated interface (e.g., Microsoft Windows) may direct CPU 402. For example, the AIX operating system and AIX windows windowing system can direct CPU 402. The AIX operating system is IBM's implementation of the UNIX™ operating system. "UNIX" is a trademark of UNIX Systems Laboratories, Inc. Other technologies also can be utilized in conjunction with CPU 402, such as touchscreen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 4 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted.

In addition, system memory 424 is connected to system bus 414, and includes a web control program 426. Control program 426 resides within system memory 424, and contains instructions that, when executed on CPU 402, carries out the operations described herein to display windows as illustrated in FIGS. 7*a*, 7*b*, 8*a*, 8*b*. Control program 426 also can be referred to as a program product.

It is important to note that, while the present invention has been (and will continue to be) described in the context of a fully functional data processing system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as data processing system 300 depicted in FIG. 3 and FIG. 4 to transmit information over standard telephone lines.

Figure 5A:
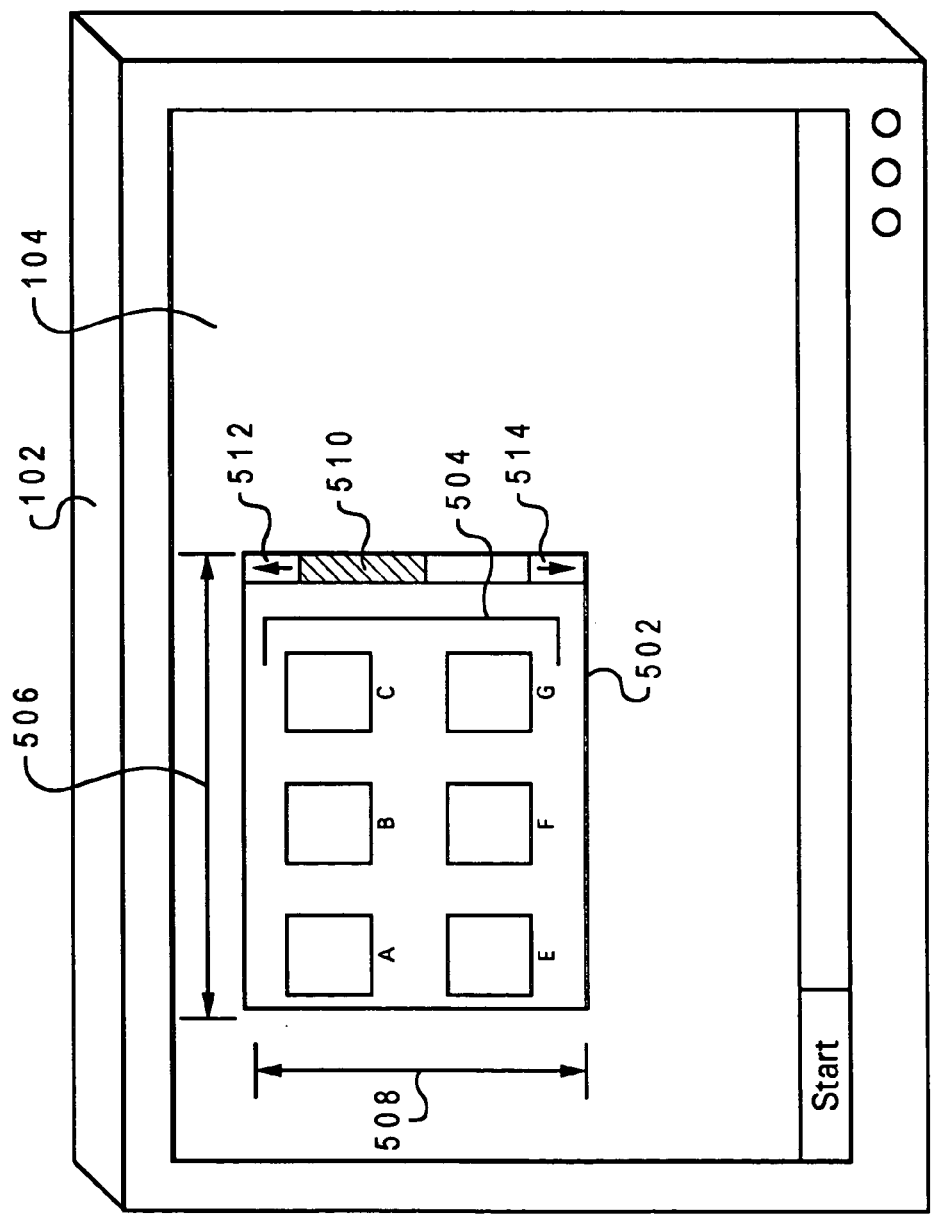
FIG. 5*a* illustrates a graphical representation of a video display screen on a hand held device displaying icons that may be utilized to implement a preferred embodiment of the present invention.

With reference now to FIG. 5*a*, there is depicted a graphical representation of video display 102 of a typical desktop data processing system which may be utilized to implement a preferred embodiment of the present invention. Video display 102 includes display screen 104 which displays window 502. Window 502 has a display width 506 and display height 508 and includes vertical scroll bar 510 comprising scroll up button 512 and scroll down button 524. Window 502 displays vertical scroll bar 510 when there is insufficient room in window 502 to show all data loaded into window 502. The area within window 502 is referred to as a screen page.

Scroll up button 512 and scroll down button 524 are responsive to user input and allow a user to shift the data displayed within window 502 up and down such that the user can see additional screen pages containing data not being displayed. Although not shown, window 502 can include a horizontal scroll bar to shift the data within window 502 left and right. When all data loaded into window 502 is displayed within the boundary of window 502, then neither vertical scroll bar 510 nor a horizontal scroll bar is displayed.

As illustrated six icons, 504 are displayed within window 502. An icon is a small image displayed on the screen to represent an object that can be manipulated by the user. By serving as visual mnemonics and allowing the user to control certain computer actions without having to remember commands or type them at the keyboard, icons 504 are a significant factor in the user-friendliness of graphical user interfaces. Icon images are typically generated from vector graphic files and bitmapped graphic files and can contain text.

Vector graphic images are generated from mathematical descriptions that determine the position, length, and direction in which lines are drawn. Vector graphic objects are created as collections of lines rather than as patterns of individual dots or pixels. A vector graphic can be scaled by applying a scaling factor to the image's mathematical definition so that a reduced or enlarged version of the image can be displayed.

Bitmapped graphic images are represented as arrays of bits in memory that represent the attributes of the individual pixels in an image. Many methods of scaling a bitmapped graphic to display a reduced or enlarged version of the image are well understood by those skilled in the art.

Figure 5B:
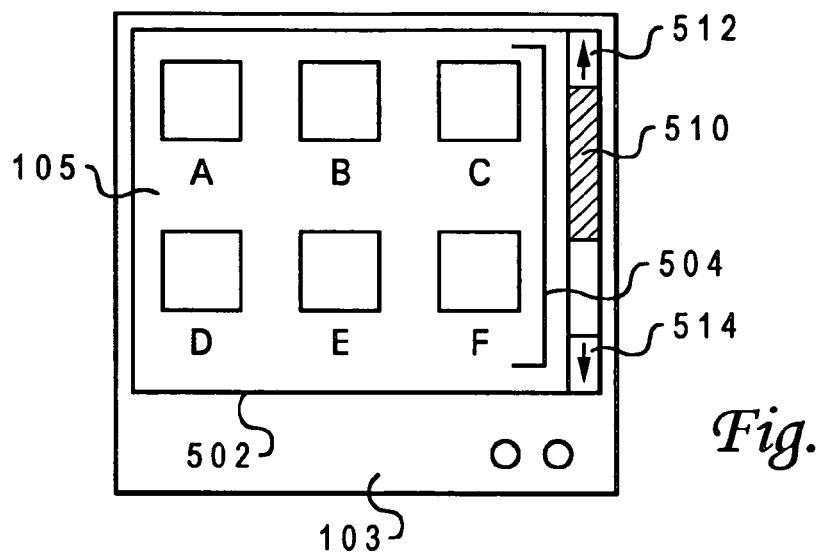
FIG. 5*b* depicts a graphical representation of a video display screen displaying icons that may be utilized to implement a preferred embodiment of the present invention.

Although FIG. 5*a* illustrates utilizing video display 102 of a typical desktop data processing system to window 502, it is appreciated that other data processing systems such as hand held devices may be utilized to implement a preferred embodiment of the present invention. For example, with reference now to FIG. 5*b*, there is illustrated a graphical representation of a video display 103 of a hand held data processing system which includes display screen 105 which displays icons 504 in window 502 in an analogous manner to window 502 displaying icons 504 illustrated in FIG. 5*a*. In typical hand held data processing devices, the physical dimensions of display screen 105 are so small, that window 502 often encompass the entire display screen 105.

Figure 6A:
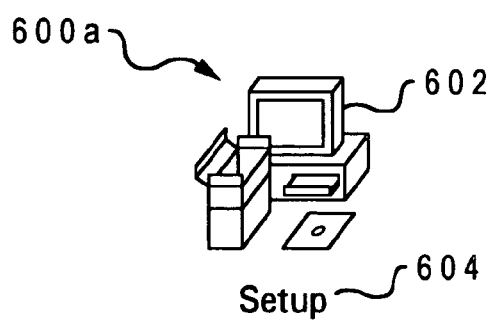
FIG. 6*a* illustrates a graphical representation of an icon, which may be utilized to implement a preferred embodiment of the present invention.
Figure 6B:
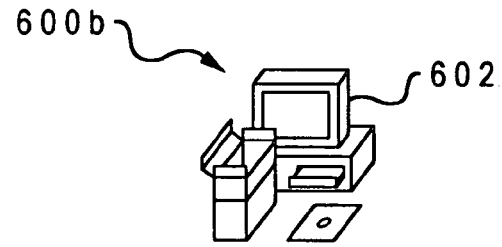
FIG. 6b depicts a graphical representation of a graphic only icon, which may be utilized to implement a preferred embodiment of the present invention.
Figure 6C:
FIG. 6c illustrates a graphical representation of a text only icon, which may be utilized to implement a preferred embodiment of the present invention.
Figure 7B:
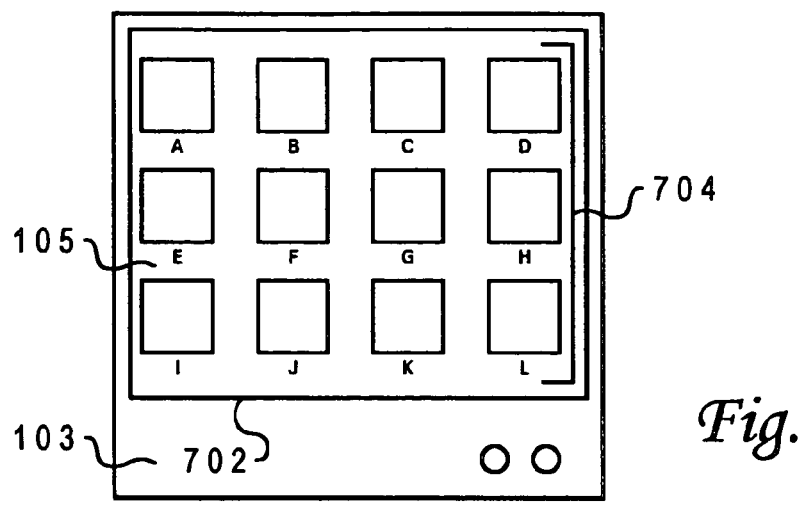
FIG. 7b illustrates a graphical representation of a video display screen on a hand held device displaying scaled icons that may be utilized to implement a preferred embodiment of the present invention.

With reference now to FIGS. 6*a*, 6*b*, and 6*c*, there are depicted icons 600*a*, 600*b* and 600*c* respectively which may be utilized to implement a preferred embodiment of the present invention. Icon 600*a* includes both graphic image 602 and text 604; icon 600*b* only has graphic image 602; and icon 600*c* only has text 604. With multiple icons types, a user can select their preferred icon type to be utilized when displaying icons. Additionally, when it is not practical to display the preferred icon type, the user could select an alternative icon type to be displayed instead. These alternative icon types could include a graphic only version such as icon 600*b*, a text only version such as icon 600*c*, or some other variation commonly used and well known in the art to abbreviate an image or an icon.

With reference now to FIG. 7a, there is illustrated a graphical representation of video display 102 of a data processing system which may be utilized to implement a preferred embodiment of the present invention. Video display 102 includes display screen 104, which displays twelve icons 704 in window 702. According to the present invention, the sizes of icons 704 are scaled such that all twelve icons 704 can be fully displayed within window 702 without displaying a horizontal or vertical scroll bar. In this manner, a user of the data processing system may view and utilize each of the twelve icons 704 without the necessity of scrolling or resizing display window 702.

It is appreciated that the present invention may be implemented on a variety of data processing systems. For example, with reference now to FIG. 7b, there is depicted a graphical representation video display 103 of a hand held data processing device which may be utilized to implement a preferred embodiment of the present invention. As shown, video display 103 includes display screen 105, which displays twelve icons 704 in window 702 wherein the sizes of icons 704 are scaled such that all twelve icons can be fully displayed within window 702.

In some situations it may be preferable to limit the maximum and minimum display size of icons 704. For example, when utilizing a small hand held data processing device, very small icons can be difficult to see and recognize. Additionally, users have different vision abilities and may wish to have a larger icons displayed on the display screen. Very large icons can also be problematic to a user. To control the final display size of icons 704, a user may select a preferred icon size, a predetermined minimum icon size and a predetermined maximum icon size. The predetermined minimum icon size represents the smallest display size of icons 704. The predetermined maximum icon size represents the largest display of icons 704.

During situations in which all icons cannot be fully displayed in the display window utilizing the predetermined minimum icon size selected by the user, a partial version of the icon can be displayed. The style of the partial icon can be selected by the user according to the users preferences.

In situations wherein the user does not wish to utilize partial icons or wherein all icons cannot be displayed in a window utilizing partial icons, the icons could be scaled and viewed on multiple display screens. For example, if twelve icons were loaded in a window but only eight icons would fit within the window display screen, then the icons would need to be viewed on multiple display screens. The methods of displaying these icons include, but are not limited to the following:

First, the icons could be scaled to a size such that a maximum number of icons, in this case eight, could be displayed within the current display window screen page. The remaining icons, in this case four, would be accessible by moving to the next screen page of the window. These four icons could be scaled, according to the user's preferences, to the same size as the previous eight, to a preferred icon size, or to another size necessary to fit the icons within the display window.

Second, the icons could be evenly distributed over the fewest window screen pages possible. In this example, since only eight icons will fit on one display screen page, two display screen pages are necessary to display all twelve icons. The twelve icons would be spilt evenly between the two display screen pages and then scaled to a preferred icon size or to another size necessary to fit the icons within the window. If there were thirteen icons instead of twelve, then seven could be displayed on the first page and six on the second.

Figure 8B:
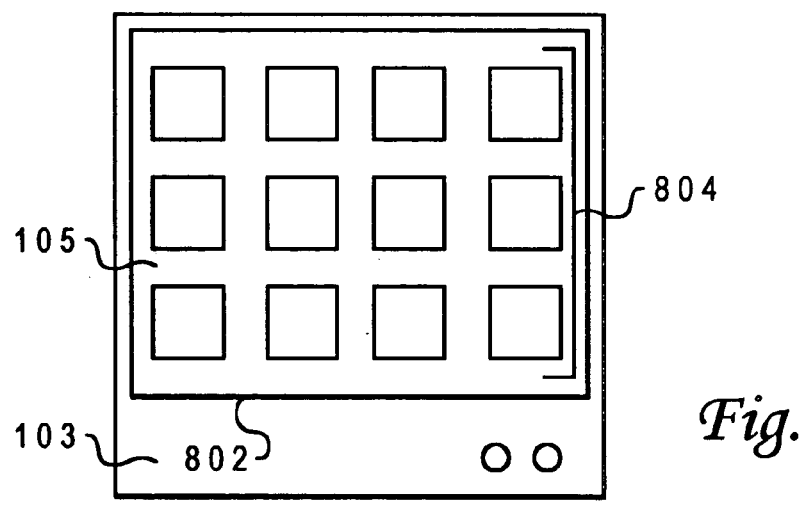
FIG. 8b illustrates a graphical representation of a video display screen on a hand held device displaying graphic only icons that may be utilized to implement a preferred embodiment of the present invention.
Figure 8A:
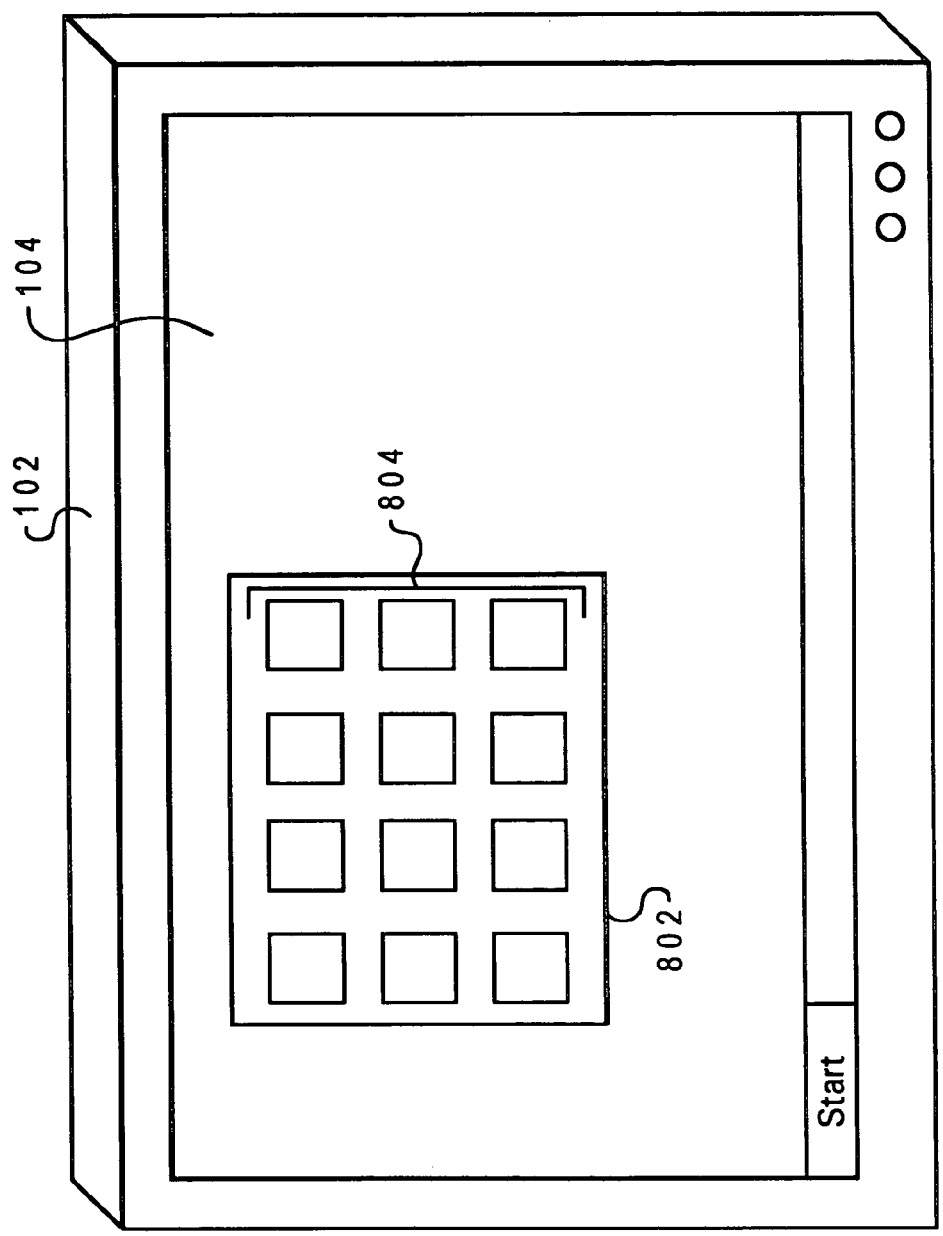
FIG. 8a depicts a graphical representation of a video display screen displaying graphic only icons that may be utilized to implement a preferred embodiment of the present invention.

With reference now to FIG. 8a, there is depicted a graphical representation of video display 102 which may be utilized to implement a preferred embodiment of the present invention. Video display 102 includes display screen 104, which displays twelve partial icons within window 802. This figure represents a situation wherein the dimensions of window 802 prevent all twelve icons 804 from being fully displayed at a size equal to or greater than the predetermined minimum icon size selected by the user of the data processing system.

In order to display all twelve icons 804 within window 802, a partial representation of icons 804 is utilized. In this example, icons 804 are represented without their text component in a manner analogous to icon 600b. By removing the text from icons 804, the modified icons can now be scaled to a size equal to or greater than the predetermined minimum icon size and to a size small enough so that they can all be displayed within the dimensions of window 802. In this manner, a user of the data processing system may view and utilize each of the twelve partial icons 804 without the necessity of scrolling or resizing display window 802.

With reference now to FIG. 8b, there is depicted a graphical representation video display 103 of a hand held data processing device analogous to the video display 102 illustrated in FIG. 8b. As shown, video display 103 includes display screen 105, which displays twelve partial icons 804 in window 802 wherein the sizes of icons 804 are scaled such that all twelve partial icons can be fully displayed within display window 702. In this example, icons 804 are represented without their text component in a manner analogous to icon 600b. In this manner, a user of the data processing system may view and utilize each of the twelve partial icons 804 without the necessity of scrolling display window 802.

Figure 9B:
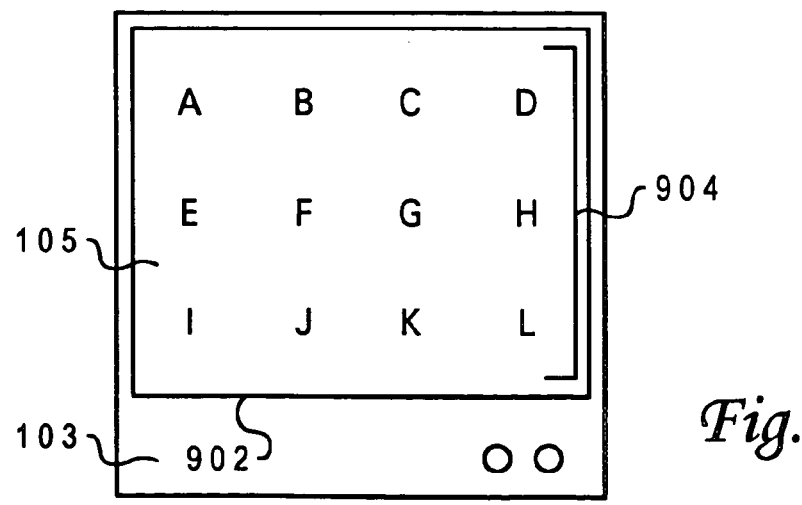
FIG. 9b illustrates a graphical representation of a video display screen on a hand held device displaying text only icons that may be utilized to implement a preferred embodiment of the present invention.
Figure 9A:
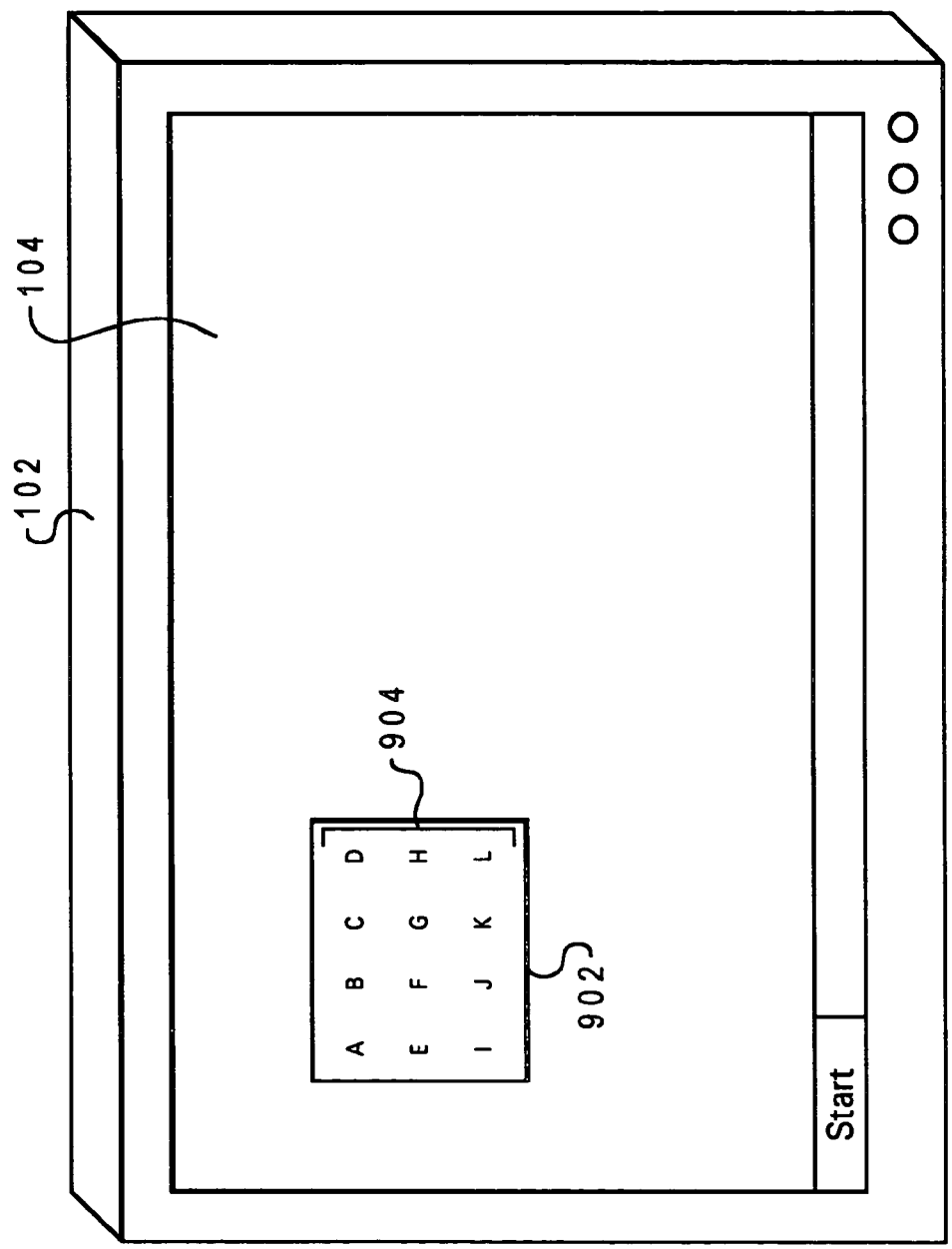
FIG. 9a depicts a graphical representation of a video display screen displaying text only icons that may be utilized to implement a preferred embodiment of the present invention.

With reference now to FIG. 9a, there is depicted a graphical representation of video display 102 which may be utilized to implement a preferred embodiment of the present invention. Video display 102 includes display screen 104, which displays twelve partial icons within display window 902. Analogous to FIG. 8a, This figure represents a situation wherein the dimensions of window 902 prevent all twelve icons 904 from being fully displayed at a size equal to or greater than the predetermined minimum icon size selected by the user of the data processing system.

In order to display all twelve icons 904 within display window 902, a partial representation of icons 904 is utilized. In this example, icons 904 are represented without their graphic component in a manner analogous to icon 600c. By removing the graphic image from icons 904, the modified icons can now be scaled to a size equal to or greater than the predetermined minimum icon size and to a size small enough so that they can all be displayed within the dimensions of window 902. In this manner, a user of the data processing system may view and utilize each of the twelve partial icons 904 without the necessity of scrolling or resizing display window 902.

With reference now to FIG. 9b, there is depicted a graphical representation video display 103 of a hand held data processing device analogous to the video display 102 illustrated in FIG. 9b. As shown, video display 103 includes display screen 104, which displays twelve partial icons 904 in window 902 wherein the sizes of icons 704 are scaled such that all twelve partial icons can be fully displayed within display window 702. In this example, icons 904 are represented without their graphic component in a manner analogous to icon 600*c*. In this manner, a user of the data processing system may view and utilize each of the twelve partial icons 904 without the necessity of scrolling display window 902.

Figure 10:
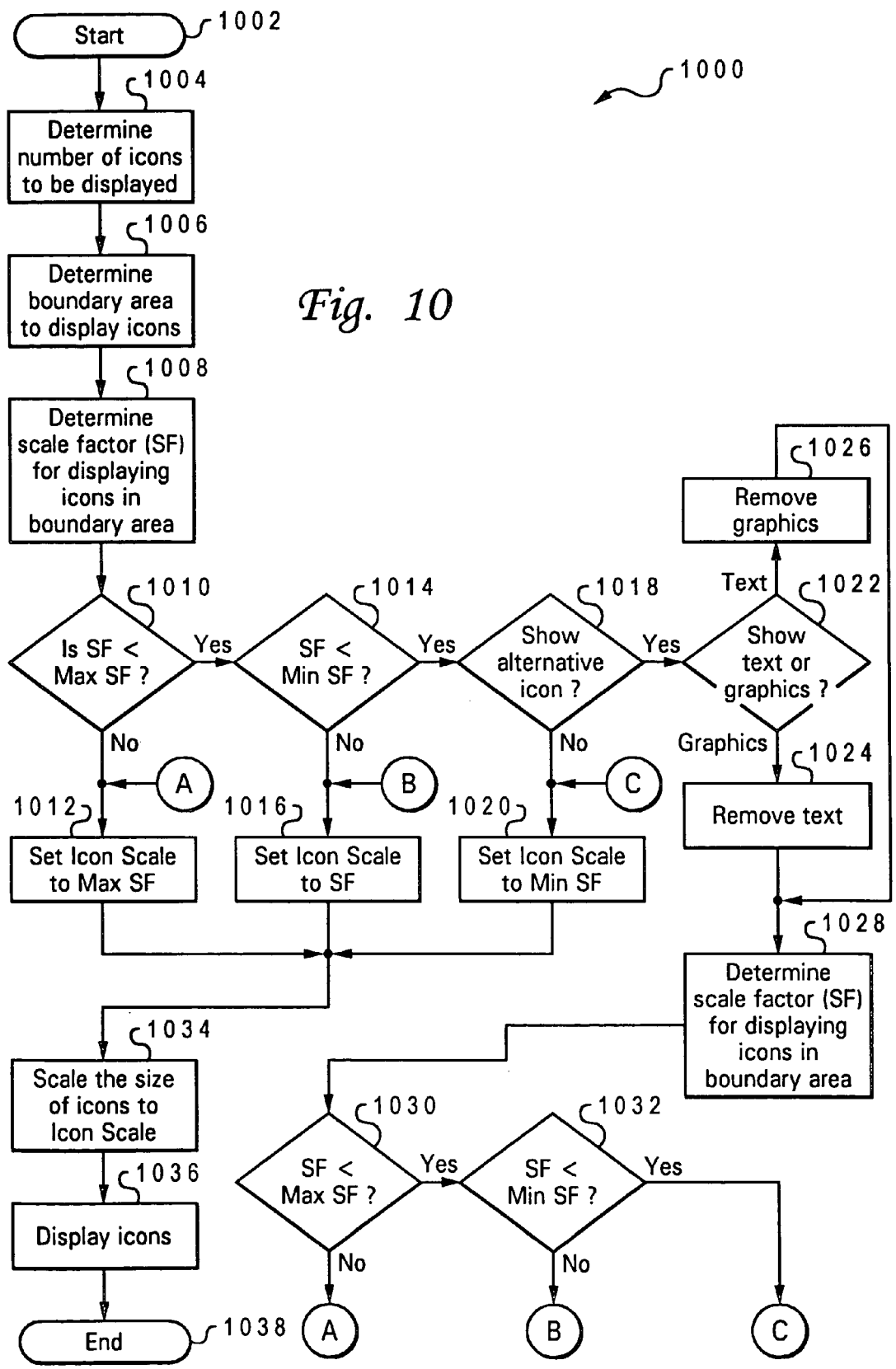
FIG. 10 depicts a high level logic flow diagram that illustrates a method for scaling icons, according to a preferred embodiment of the present invention.

FIG. 10 illustrates a high-level logic flow diagram that illustrates a method for scaling and displaying icons, according to a preferred embodiment of the present invention. As depicted at block 1002, the process is initiated. As illustrated at block 1004, the number of icons to be displayed in a particular boundary area of the display screen is determined. As shown at block 1006, the boundary area for displaying the icons is determined. Next, as depicted at block 1008, a scale factor (SF) for scaling the icons is determined such that the icons can be displayed entirely within the boundary area.

As illustrated at block 1010, a test is performed to determine whether the scale factor (SF) is less than the predetermined maximum scale factor. If this test is true, then the process continues as described at block 1014. If this test is false, then the process continues as described at block 1012.

Next, as depicted at block 1014, a test is performed to determine whether the scale factor (SF) is less than the predetermined minimum scale factor. If this test is true, then the process continues as described at block 1018. If this test if false, then the process continues as described at block 1016.

Thereafter, as depicted at block 1018, a test is performed to determine whether the an alternative icon type should be utilized to display the icons. If this test is true, then the process continues as described at block 1022. If this test if false, then the process continues as described at block 1020.

Next, as illustrated at block 1024, text is removed from the icon image. As depicted at block 1026, graphics are removed from the icon image. As shown at block 1028, the scale factor (SF) for scaling the icons is determined such that the icons can be displayed in the boundary area. This procedure is analogous to the procedure shown at block 1008.

Still referring to FIG. 10, as depicted at block 1030, a test is performed analogous to the one illustrated at block 1010 to determine whether the scale factor (SF) is less than the predetermined maximum scale factor. If this test is true, then the process continues as described at block 1032. If this test is false, then the process continues through connector A to block 1012.

Next, as depicted at block 1032, a test is performed analogous to the one illustrated at block 1014 to determine whether the scale factor (SF) is less than the predetermined minimum scale factor. If this test is true, then the process continues through connector C to block 1020. If this test is false, then the process continues through connector B to block 1016.

Icon scale (IS) is set to a maximum value, as depicted at block 1012. The maximum value represents the scale factor used to show the icons at their maximum size as selected by the user. As shown at block 1016, icon scale is set to scale factor (SF). As illustrated at block 1020, icon scale (IS) is set to a minimum value. The minimum value represents the scale factor used to show the icons at their maximum size as selected by the user. As depicted at block 1034, the sizes of the icons are scaled by a factor of icon scale (IS). Thus, if icon scale (IS) is less than 1, the icon image size is reduced. If icon scale (IS) is greater than 1, the icon image size is enlarged. As illustrated at block 1036, icons are displayed at their newly scaled size within the boundary area of the display screen. As depicted at block 1038, the process is terminated.

While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

As has been described, the present invention provides a method and system to automatically scale icons to be displayed on a display screen.

In a first aspect of the present invention, the sizes of the icons are reduced to fit within a boundary area of the display screen. According to a second aspect of the present invention, the sizes of the icons are increased to fit within a boundary area of the display screen.

While the invention has been particularly shown and described with reference to a preferred embodiment, it will be understood by those skilled in the art that various changes in form and detail may be made therein without departing from the spirit and scope of the invention.

What is claimed is:

1. A method of displaying icons within a data processing system having a display screen, comprising the steps of:
   first determining a quantity of a plurality of icons to be displayed on a display screen of a data processing system;
   second determining a designated portion of said display screen for displaying said plurality of icons; and
   automatically scaling each of said plurality of icons in response to said quantity of said plurality of icons and said designated portion such that all of said plurality of icons can be displayed in said designated portion of said display screen.

2. The method of claim 1, wherein said step of first determining a quantity of a plurality of icons to be displayed on a display screen of a data processing system comprises first determining a quantity of plurality icons defined by vector graphics to be displayed on a display screen of a data processing.

3. The method of claim 1, wherein said step of first determining a quantity of a plurality of icons to be displayed on a display screen of a data processing system comprises first determining a quantity of a plurality of icons defined by bitmapped graphics to be displayed on a display screen of a data processing system.

4. The method of claim 1, further comprising the step of displaying all of said plurality of icons on said designated portion of said display screen.

5. The method of claim 1, further comprising the step of displaying all of said plurality of icons on said designated portion of said display screen, wherein said plurality of icons comprise a graphic image and a text image.

6. The method of claim 1, further comprising the step of displaying all of said plurality icons on said designated portion of said display screen, wherein said plurality of icons only comprise a text image.

7. The method of claim 4, wherein said step of displaying all of said plurality of icons on said designated portion of said display screen, comprises displaying all of said plurality of icons on said designated portion of said display screen, wherein said designated portion of said display screen has a fixed pixel width and a fixed pixel height.

8. A icon scaling system for use with a data processing system having a display, said icon scaling system comprising:
   a calculation routine that determines a quantity of a plurality of icons to be displayed on a display screen of a data processing system;
   a boundary routine that determines a designated portion of said display screen for displaying said plurality of icons; and
   a scaling routine that automatically scales said plurality of icons in response to quantity of a plurality of icons and said designated portion such that all of said plurality of icons can be displayed in said designated portion of said display screen.

9. The system of claim 8, wherein said plurality of icons are defined by vector graphics.

10. The system of claim 8, wherein said plurality of icons axe defined by bitmapped graphics.

11. The system of claim 8, fiber comprising a display routine that displays said plurality of icons, on said display screen.

12. The system of claim 8, wherein said plurality of icons comprise a graphic image and a text image.

13. The system of claim 8, wherein said plurality of icons comprise only a text image.

14. The system of claim 8, wherein said designated portion of said display screen has a fixed pixel width and a fixed pixel height.

15. An article of manufacture for use in a data processing system for scaling icons on a display screen, the article of manufacture comprising computer readable storage media including program logic embedded therein that causes control circuitry to perform the steps of:
   first determining a quantity of a plurality of icons to be displayed on a display screen of a data processing system;
   second determining a designated portion of said display screen for displaying said plurality of icons; and
   automatically scaling said plurality of icons in response to said quantity of said plurality of icons and said designated portion such that all of said quantity of said plurality of icons can be displayed in said designated portion of said display screen.

16. The article of manufacture of claim 15, wherein said step of first determining a quantity of a plurality of icons to be displayed on a display screen of a data processing system comprises first determining a quantity of a plurality of icons defined by vector graphics to be displayed on a display screen of a data processing.

17. The article of manufacture of claim 15, wherein said step of first determining a quantity of a plurality of icons to be displayed on a display screen of a data processing system comprises first determining a quantity of a plurality of icons defined by bitmapped graphics to be displayed on a display screen of a data processing system.

18. The article of manufacture of claim 15, further comprising the step of displaying all of said plurality of icons on said designated portion of said display screen.

19. The article of manufacture of claim 15, further comprising the step of displaying all of said plurality of icons on said designated portion of said display screen, wherein said plurality of icons comprise a graphic image and text image.

20. The article of manufacture of claim 15, further comprising the step of displaying all of said plurality of icons on said designated portion of said display screen, wherein said plurality of icons only comprise a text image.

21. The article of manufacture of claim 18, wherein said step of displaying all of said plurality of icons on said designated portion of said display screen, comprises displaying all of said plurality of icons on a display screen, wherein said display screen has a fixed pixel width and a fixed pixel height.

22. A method, for displaying icons within a data processing system having a display screen, comprising the steps of:
   determining a size of a designated portion of a display screen for displaying a plurality of icons;
   displaying all of said plurality of icons within said determined size of said designated portion by at least one of a) automatically scaling said icons; b) displaying a portion of each one of said plurality of icons; and c) creating a plurality of selectable displayed screen pages wherein each screen page has a portion of said plurality of icons displayed within said determined size of said designated portion.

23. A method, for displaying icons within a data processing system having a display screen, comprising the steps of:
   determining a size of a designated portion of a display screen for displaying a plurality of icons;
   utilizing a predetermined minimum size and a predetermined maximum size for an individual icon;
   displaying all of said plurality of icons within said determined size of said designated portion, based upon said predetermined minimum size and said predetermined maximum size, by at least one of a) automatically scaling said icons; b) displaying a portion of each one of said plurality of icons; and c) creating a plurality of selectable displayed screen pages wherein each screen page has a portion of the plurality of icons displayed within said determined size of said designated portion.

24. The method of claim 23 wherein said predetermined minimum size and said predetermined maximum size are predetermined based on user input.

25. A data processing system having a display screen, comprising:
   means for determining a size of a designated portion of a display screen for displaying a plurality of icons;
   means for displaying all of said plurality of icons within said determined size of said designated portion by at least one of a) automatically scaling said icons; b) displaying a portion of each one of said plurality of icons; and c) creating a plurality of selectable displayed screen pages wherein each screen page has a portion of said plurality of icons displayed within said determined size of said designated portion.

26. A data processing system for displaying icons on a display screen, comprising:
   means for determining a size of a designated portion of a display screen for displaying a plurality of icons;
   means for utilizing a predetermined minimum size and a predetermined maximum size for an individual icon;
   means for displaying all of said plurality of icons within said determined size of said designated portion, based upon said predetermined minimum size and said predetermined maximum size, by at least one of a) automatically scaling said icons; b) displaying a portion of each one of said plurality of icons; and c) creating a plurality of selectable displayed screen pages wherein each screen page has a portion of the plurality of icons displayed within said determined size of said designated area.

27. The data processing system of claim 26 wherein said predetermined minimum size and said predetermined maximum size are predetermined based on user input.

28. The data processing system of claim 26 wherein the data processing system is a hand held device.

29. An article of manufacture for use in a data processing system for scaling icons on a display screen, the article of manufacture comprising computer readable storage media including program logic embedded therein that causes control circuitry to perform the steps of:
   determining a size of a designated portion of a display screen for displaying a plurality of icons;
   displaying all of said plurality of icons within said determined size of said designated area by at least one of a) automatically scaling said icons; b) displaying a portion of each one of said plurality of icons; and c) creating a plurality of selectable displayed screen pages wherein each screen page has a portion of said plurality of icons displayed within said determined size of said designated portion.

30. An article of manufacture for use in a data processing system for scaling icons on a display screen, the article of manufacture comprising computer readable storage media including program logic embedded therein that causes control circuitry to perform the steps of:
   determining a size of a designated portion of a display screen for displaying a plurality of icons;
   utilizing a predetermined minimum size and a predetermined maximum size for an individual icon;
   displaying all of said plurality of icons within said determined size of said designated portion, based upon said predetermined minimum size and said predetermined maximum size, by at least one of a) automatically scaling said icons; b) displaying a portion of each one of said plurality of icons; and c) creating a plurality of selectable displayed screen pages wherein each screen page has a portion of the plurality of icons displayed within said determined size of said designated portion.

31. The article of manufacture claim 23 wherein said predetermined minimum size and said predetermined maximum size are predetermined based on user input.

* * * * *

UNITED STATES PATENT AND TRADEMARK OFFICE
CERTIFICATE OF CORRECTION

| | | |
|---|---|---|
| PATENT NO. | : 6,983,424 B1 | Page 1 of 1 |
| APPLICATION NO. | : 09/599893 | |
| DATED | : January 3, 2006 | |
| INVENTOR(S) | : R. Dutta | |

It is certified that error appears in the above-identified patent and that said Letters Patent is hereby corrected as shown below:

In Col. 11, please replace Claims 10 and 11 with the following lines 37-38

-- 10. The system of claim 8, wherein said plurality of icons *are* defined by bitmapped graphics.-- ines 39-41

-- 11. The system of claim 8, *further* comprising a display routine that displays *all of* said plurality of icons, on said *designated portion of said* display screen.--

Signed and Sealed this

Twenty-eighth Day of November, 2006

JON W. DUDAS
*Director of the United States Patent and Trademark Office*